(12) United States Patent
Liu et al.

(10) Patent No.: US 10,451,352 B2
(45) Date of Patent: Oct. 22, 2019

(54) MICRO-CHANNEL HEAT EXCHANGER

(71) Applicant: DUNAN ENVIRONMENT TECHNOLOGY CO., LTD, Hangzhou, Zhejiang (CN)

(72) Inventors: Huazhao Liu, Zhejiang (CN); Dingjun Wang, Zhejiang (CN)

(73) Assignee: DUNAN ENVIRONMENT TECHNOLOGY CO., LTD, Hangzhou (CN)

( * ) Notice: Subject to any disclaimer, the term of this patent is extended or adjusted under 35 U.S.C. 154(b) by 105 days.

(21) Appl. No.: 15/782,810

(22) Filed: Oct. 12, 2017

(65) Prior Publication Data

US 2018/0112923 A1    Apr. 26, 2018

(30) Foreign Application Priority Data

Oct. 26, 2016    (CN) .......................... 2016 1 0941511

(51) Int. Cl.
| | |
|---|---|
| F28D 1/053 | (2006.01) |
| B21D 53/08 | (2006.01) |
| B23P 15/26 | (2006.01) |
| F28F 1/12 | (2006.01) |
| F28F 1/14 | (2006.01) |
| F28F 17/00 | (2006.01) |
| F28F 9/02 | (2006.01) |

(52) U.S. Cl.
CPC ......... *F28D 1/05366* (2013.01); *B21D 53/08* (2013.01); *B23P 15/26* (2013.01); *F28D 1/05375* (2013.01); *F28F 1/128* (2013.01); *F28F 1/14* (2013.01); *F28F 17/005* (2013.01); *F28F 2009/0292* (2013.01); *F28F 2225/06* (2013.01); *F28F 2260/02* (2013.01); *F28F 2275/04* (2013.01)

(58) Field of Classification Search
CPC ............. F28D 1/05366; F28D 1/05375; F28D 1/0435; F28D 1/0443; F28D 2001/0266; F28D 2001/0273; F28F 1/128; F28F 9/26; F28F 1/14; F28F 2255/02; B21D 53/08; B23P 15/26
USPC ..................................... 165/152, 81, 82, 149
See application file for complete search history.

(56) References Cited

U.S. PATENT DOCUMENTS

| | | | | |
|---|---|---|---|---|
| 4,574,868 A | * | 3/1986 | Anders | ............... F28D 1/05366 165/124 |
| 4,926,931 A | * | 5/1990 | Larinoff | .................... F28B 1/06 165/111 |
| 7,699,095 B2 | * | 4/2010 | Beamer | ............... F28D 1/05366 165/151 |

(Continued)

*Primary Examiner* — Raheena R Malik

(57) ABSTRACT

The present invention discloses a novel micro-channel heat exchanger, comprising header pipes, a plurality of first flat pipes and fins, and further comprising a bending region formed by bending the header pipes, wherein second flat pipes and a bending assembly are provided in the bending region, the second flat pipes are connected between adjacent header pipes, the bending assembly is distributed between adjacent second flat pipes, and air is capable of passing through the bending assembly to circulate. On the premise that the performance of the heat exchanger is guaranteed, the present invention well solves the problem of fin deformation caused when the heat exchanger is bent along a length direction of the header pipes.

8 Claims, 6 Drawing Sheets

(56) References Cited

U.S. PATENT DOCUMENTS

| | | | |
|---|---|---|---|
| 7,900,689 B2* | 3/2011 | Samuelson | B23P 15/26 165/176 |
| 9,115,939 B2* | 8/2015 | Huazhao | F28D 1/05383 |
| 2011/0094257 A1* | 4/2011 | Rusignuolo | F28D 1/0443 62/498 |

* cited by examiner

MICRO-CHANNEL HEAT EXCHANGER

CROSS REFERENCE TO RELATED APPLICATIONS

The present application claims the benefit of Chinese Patent Application No. 201610941511.2 filed on Oct. 26, 2016. All the above are hereby incorporated by reference.

FIELD OF THE INVENTION

The present invention relates to the field of refrigeration air conditioners, in particular to a micro-channel heat exchanger.

BACKGROUND OF THE INVENTION

A micro-channel heat exchanger has the advantages such as light weight, compact structure, high heat exchange efficiency, all-aluminum material and convenience in recovery, and the like; and at the same time, an internal volume of the micro-channel heat exchanger is small, the filling amount of refrigerant is greatly reduced and thus the micro-channel heat exchanger is widely applied to commercial/domestic air conditioner fields.

In order to obtain corresponding heat exchange amount and energy-efficiency ratio in a limited unit space, a heat exchanger in an air conditioner often needs to be bent to a certain angle to increase a heat exchange area, so as to satisfy the performance requirement during air conditioner design. Simultaneously, air conditioning units in the current market are mostly heat-pump air conditioners which consider refrigeration and heating at the same time. In order to satisfy the demands of air conditioning units for drainage performance during operation in winter, the micro-channel heat exchange is generally designed in such a way that header pipes are horizontally disposed, and flat pipes and fins are vertically disposed. Therefore, the micro-channel heat exchanger needs to be bent along a length direction of the header pipes to form a structure having a designated angle. In a bending process of a traditional micro-channel heat exchanger, fins on an inner side of a bend are squeezed, deformation such as inverted fins and distortion and the like occurs and the circulation of air is thereby obstructed; and fins on an outer side of the bend are stretched, situations such as stretching deformation and even tearing and the like occur, the appearance of the heat exchanger is seriously influenced, and at the same time, since the fins are torn, the heat exchange performance of the heat exchange is decreased.

U.S. patent with publication number U.S. Pat. No. 7,900,689B2 discloses a heat exchanger. In this heat exchanger, a bending part adopts sheet metal parts to replace corrugated fins. Although the problems of inverted fins and distortion are solved, since air cannot smoothly pass through the bending part and the surface area of the sheet metal parts is greatly decreased relative to the surface area of the corrugated fins, a loss is caused to the heat exchange performance of the heat exchanger.

SUMMARY OF THE INVENTION

In order to solve the above-mentioned problem, the present invention provides a micro-channel heat exchanger, so as to well solve the problem of fin deformation caused when the heat exchanger is bent along a length direction of header pipes on the premise that the performance of the heat exchanger is guaranteed.

In order to achieve the above-mentioned purpose, the present invention adopts the following technical solution: a micro-channel heat exchanger, comprising at least two header pipes, a plurality of first flat pipes and fins, the first flat pipes being connected between adjacent header pipes, the fins being installed between adjacent first flat pipes, is wherein the micro-channel heat exchanger further comprises a bending region formed by bending the header pipes, second flat pipes and a bending assembly are provided in the bending region, the second flat pipes are connected between adjacent header pipes, the bending assembly is distributed between adjacent second flat pipes, and air is capable of passing through the bending assembly to circulate.

Further, the bending assembly comprises a plurality of strip-shaped bending members and the bending members have creases along a length direction.

Further, through holes are provided in the bending members.

Further, the through holes are located in left and right sides of the creases.

Further, the bending assembly further comprises first base plates which are provided on side surfaces of the second flat pipes and the bending members are provided on the first base plates.

Further, the bending members and the first base plates are fixed through brazing; or the first base plates and the second flat pipes are connected through brazing.

Alternatively, the bending assembly comprises first ribs and second ribs, the first fibs are located on one side of the second flat pipes, the second ribs are located on an adjacent side opposite to the side on which the first ribs are provided, and the first ribs and the second ribs are distributed in a staggered manner.

Further, the bending assembly further comprises second base plates, the second base plates are distributed between adjacent second flat pipes, one side of each second base plate is connected with the second flat pipe and the other side is connected with the first ribs or the second ribs; or the second base plates and the second flat pipes are connected through brazing.

Further, the bending assembly further comprises a supporting rack through which adjacent second base plates are connected.

Further, a through hole is provided in the supporting rack.

By adopting the above-mentioned technical solution, the present invention has the following advantages: since multiple bending members or ribs are adopted in the bending assembly, the heat exchange area is prevented from being lost; at the same time, due to air vents provided in the bending members or the structural feature of the ribs themselves, air can smoothly pass through the bending part and the heat exchange performance of the heat exchanger is guaranteed; when the heat exchanger is bent along the length direction of the header pipes, due to the structural feature of the bending members or ribs, the situations such as fin deformation, inverted fins and even tearing and the like are prevented from occurring, and a good appearance of the heat exchanger is guaranteed.

These features and advantages of the present invention will be described in detail in embodiments and drawings below.

DESCRIPTION OF THE DRAWINGS

The present invention will be further described below with reference to the drawings.

DESCRIPTION OF THE EMBODIMENTS

The technical solutions of the embodiments of the present invention will be explained and described below with reference to the drawings of the embodiments of the present invention. However, the following embodiments are just preferred embodiments of the present invention instead of all embodiments. Based on the embodiments in the implementation modes, other embodiments obtained by one skilled in the art without contributing any inventive labor are all included in the protection scope of the present invention.

The present invention provides a micro-channel heat exchanger.

Embodiment 1

Figure 1:
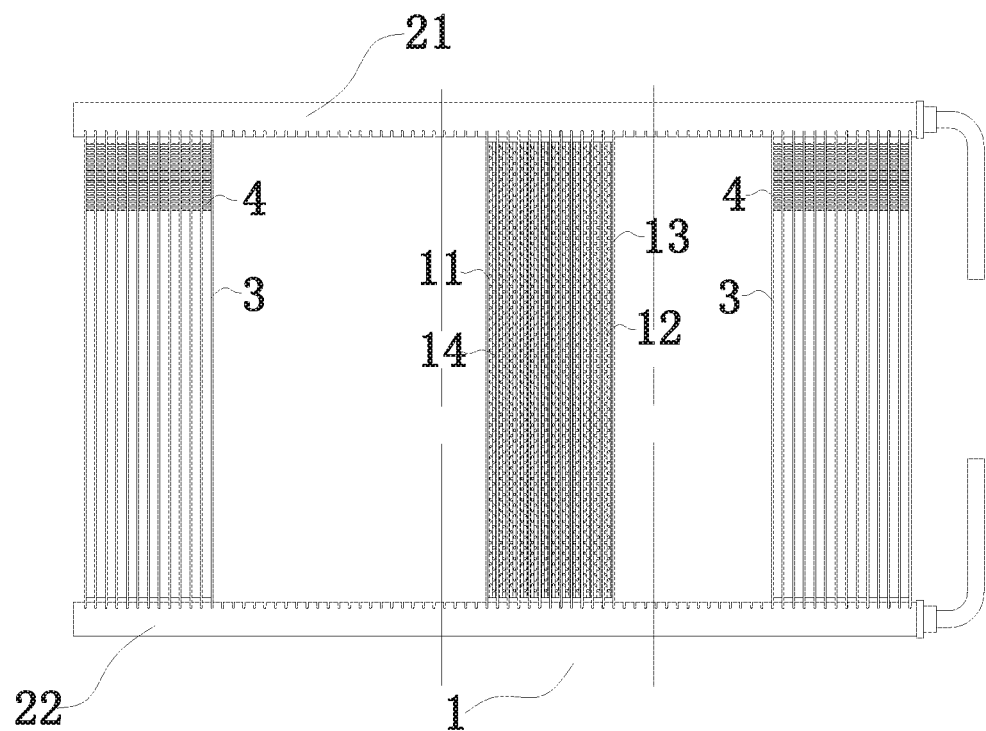
FIG. 1 is an overall view according to Embodiment 1 of the present invention.

As illustrated in FIG. 1, in Embodiment 1, a micro-channel heat exchanger adopts two header pipes which are respectively an upper header pipe 21 and a lower header pipe 22, the upper header pipe 21 and the lower header pipe 22 are arranged in parallel, middle portions of the upper header pipe 21 and the lower header pipe 22 are bent to form a bending region 1, and thus the bending region 1 is located at a middle position of the entire micro-channel heat exchanger. In regions where bending does not occur on two sides, first flat pipes 3 are equally distributed in parallel between the upper header pipe 21 and the lower header pipe 22, fins 4 are provided between adjacent first flat pipes 3, and the fins 4 are common corrugated fins. In the bending region 1, second flat pipes 13 are equally distributed in parallel between the upper header pipe 21 and the lower header pipe 22, first base plates 11 are provided between adjacent second flat pipes 13, adjacent first base plates 11 are connected through bending members 12, and a connection mode is brazing; and through holes 14 for air to flow are provided in the bending members 12, the through holes 14 may be circular or other shapes. In embodiment 1 the through holes 14 are circular through holes, two columns of through holes 14 are provided in each bending member, the two columns of through holes 14 are disposed in a staggered manner and the circulation of air is guaranteed.

Figure 2:
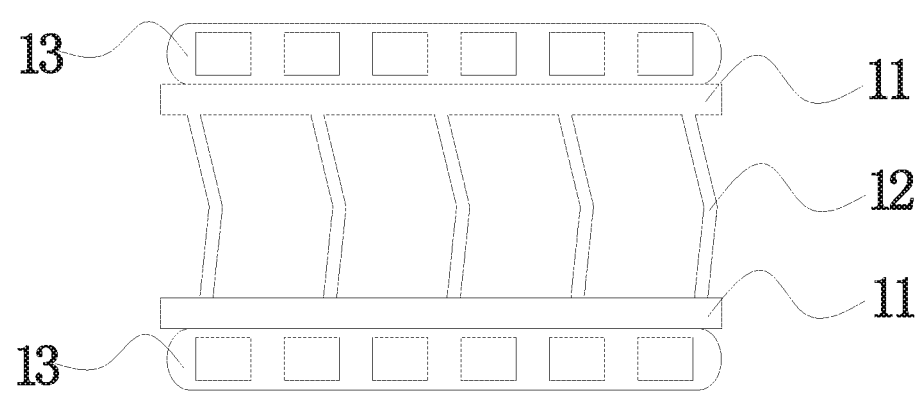
FIG. 2 is a partial enlarged top view of a bending region according to Embodiment 1 of the present invention.
Figure 3:
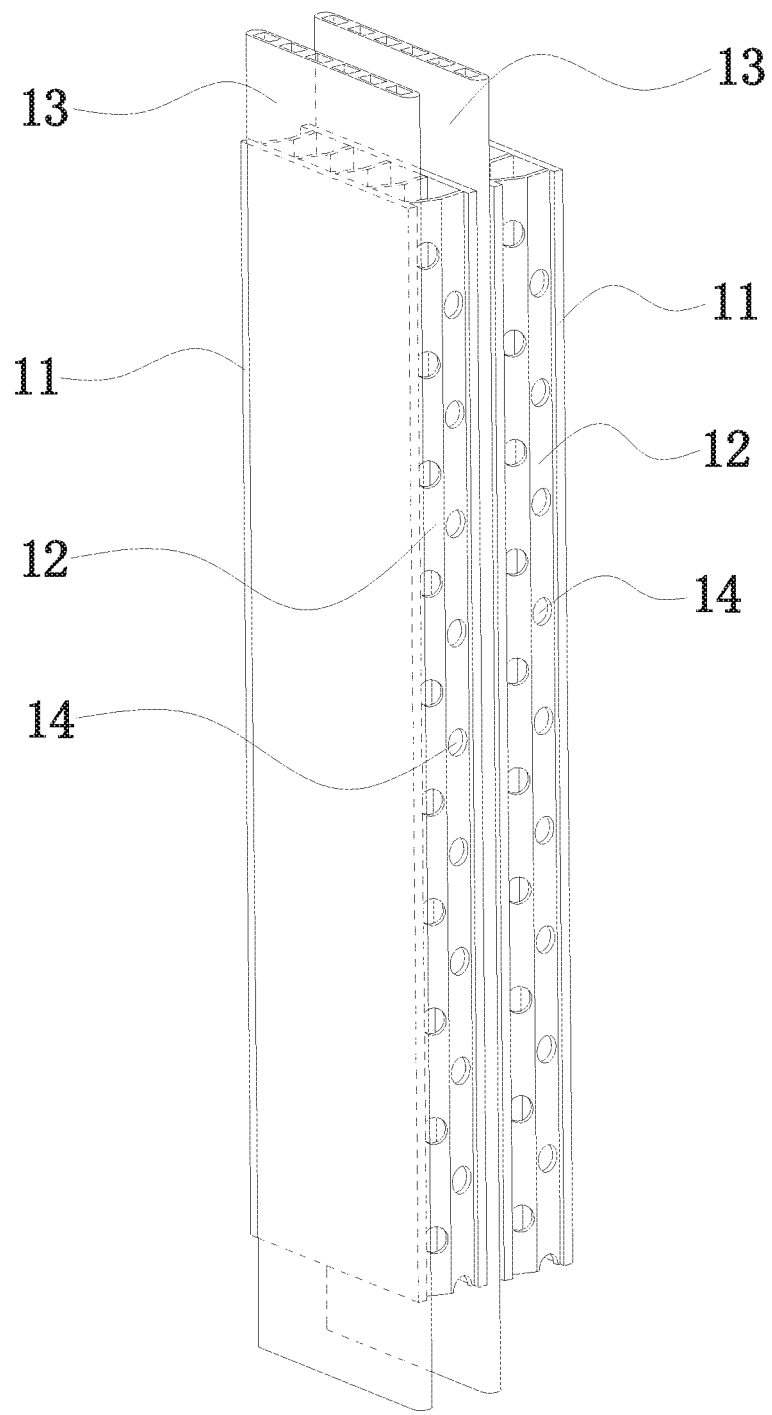
FIG. 3 is a partial stereoscopic view of a bending region according to Embodiment 1 of the present invention.

As illustrated in FIG. 2 and FIG. 3, two first base plates 11 are provided between two adjacent second flat pipes 13, and the second flat pipes 13 and the first base plates 11 are connected through brazing. A bending assembly consists of the first base plates 11 and the bending members 12, the bending members 12 between the two first base plates 11 are in a V-shape along a width direction and may also be in other shapes such as a W-shape. In embodiment 1 the bending members 12 are in a V-shape, and five bending members 12 are provided. Preferably, the five bending members 12 in this embodiment face the same direction, such that not only can the attractiveness of the overall effect be guaranteed, but also the heat exchange area is increased.

Figure 4:
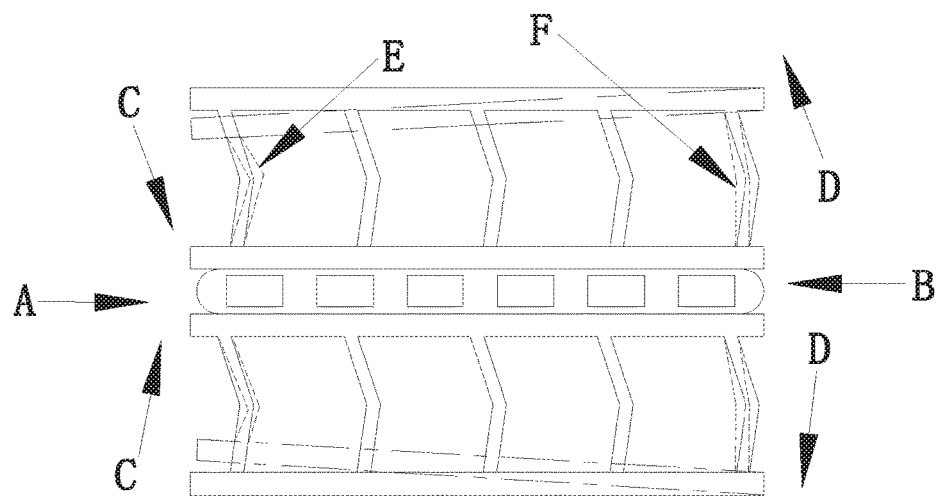
FIG. 4 is a partial enlarged top view of a bending region deformed during bending according to Embodiment 1 of the present invention.

As illustrated in FIG. 4, side A is an inner side of the bending region, side B is an outer side of the bending region, direction C is a squeezing direction of the bending region 1 during bending in Embodiment 1, and direction D is a stretching direction of the bending region 1 during bending in Embodiment 1; and E is a bending member 12 which is stretched and F is a bending member 12 which is squeezed. When the micro-channel heat exchanger is bent, the bending region 1 is stressed and bent from a flat plate state to a curved surface having a certain radian, at this moment an arc length of the outer side of the bending region 1 is greater than an arc length of the inner side of the bending region 1, at this moment the outer side of the bending region 1 is stressed and stretched, the inner side of the bending region 1 is stressed and squeezed, consequently the bending members 12 close to the outer side in the bending region 1 are stretched and the bending members 12 close to the inner side are squeezed. Since creases are provided on the bending members 12 in advance, a bending angle of the squeezed bending members 12 at the positions of the creases is decreased, a bending angle of the stretched bending members 12 at the positions of the creases is increased, and thereby the problems such as inverted fins and deformation and the like that occur when common fins are bent are solved.

Embodiment 2

Figure 5:
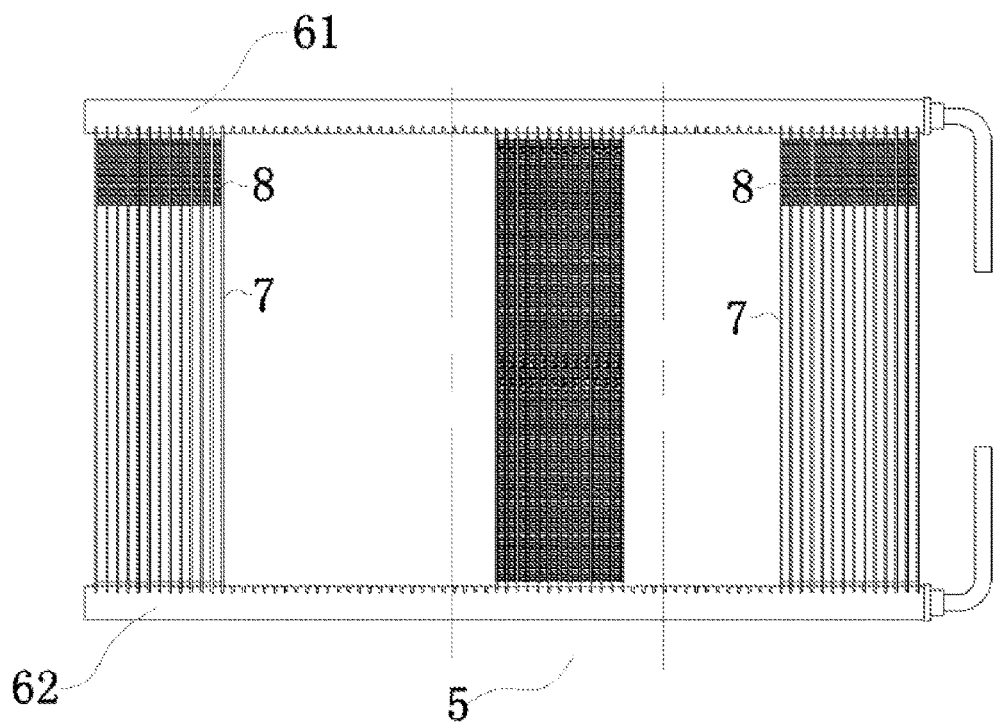
FIG. 5 is an overall view according to Embodiment 2 of the present invention.

As illustrated in FIG. 5, in Embodiment 2, a micro-channel heat exchanger adopts two header pipes which are respectively an upper header pipe 61 and a lower header pipe 62, the upper header pipe 61 and the lower header pipe 62 are arranged in parallel, middle portions of the upper header pipe 61 and the lower header pipe 62 are bent to form a bending region 5, and thus the bending region 5 is located at a middle position of the entire micro-channel heat exchanger. In regions where bending does not occur on two sides, first flat pipes 7 are equally distributed in parallel between the upper header pipe 61 and the lower header pipe 62, fins 8 are provided between adjacent first flat pipes 7, and the fins 8 are common corrugated fins.

Figure 6:
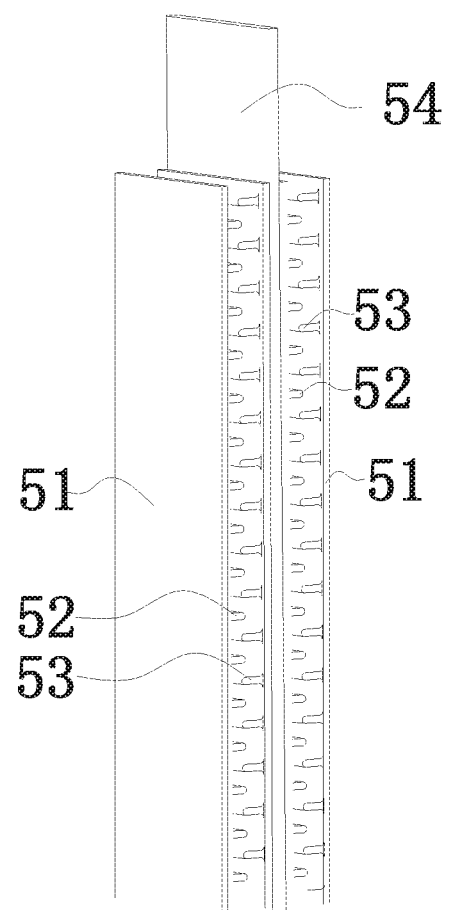
FIG. 6 is a partial stereoscopic view of a bending region according to Embodiment 2 of the present invention.

As illustrated in FIG. 6, in Embodiment 2, second base plates 51 are respectively provided on two sides of second flat pipes 54, and the second flat pipes 54 and the first base plates 51 are connected through brazing. First ribs 52 and second ribs 53 are respectively provided on opposite surfaces of adjacent second base plates 51, the first ribs 52 and the second ribs 53 are disposed in a staggered manner and have a certain spacing, and the first ribs 52 are inserted between adjacent second ribs 53; the second ribs 53 are inserted between adjacent first ribs 52, the first ribs 52 and the second ribs 53 which are disposed in a staggered manner have full movement spaces during bending, and simultaneously the multiple first ribs 52 and second ribs 53 guarantee the heat exchange area.

Figure 7:
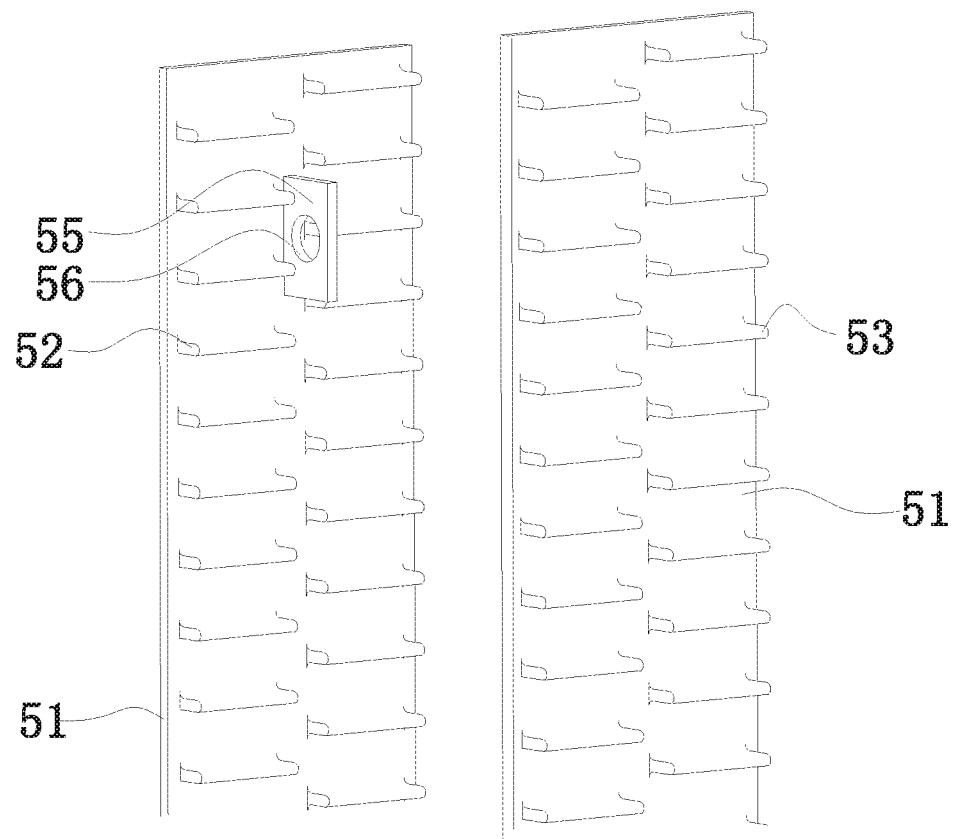
FIG. 7 is a stereoscopic view of constituent structures of a bending assembly according to Embodiment 2 of the present invention.
Figure 8:
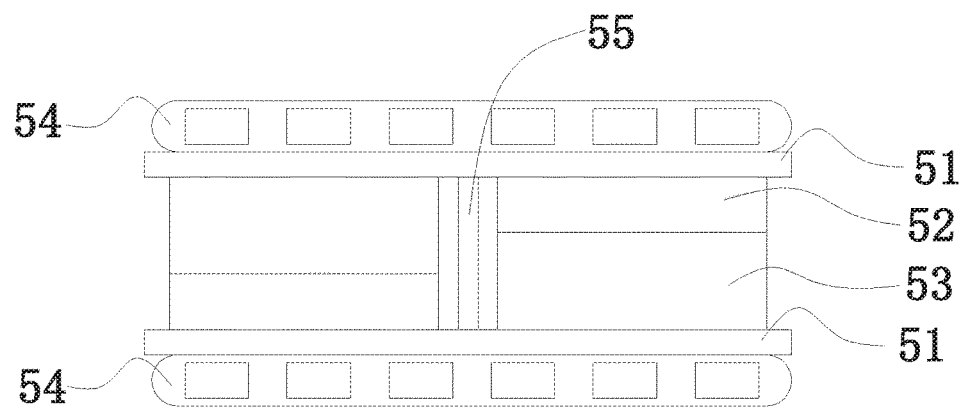
FIG. 8 is a partial enlarged top view of a bending region according to Embodiment 2 of the present invention.

As illustrated in FIG. 7 and FIG. 8, the bending assembly consists of the second base plates 51, the first ribs 52, the second ribs 53 and a supporting member 55. The supporting member 55 is a square, two columns of the first ribs 52 and the second ribs 53 are respectively provided on the second base plates 51, the supporting member 55 is connected with adjacent second base plates 51, the supporting member 55 on the second base plate 51 on one side is located between the two columns of the first ribs 52, and the supporting member 55 on the second substrate 51 on the opposite side is located between the two columns of the second ribs 53. A through hole 56 for air to flow is provided in the supporting member 55. The through hole 56 may be in any shape such as a circular shape, a polygonal shape and an elliptical shape, and the like. In this embodiment, the through hole 56 is circular. Since the first ribs 52 and the second ribs 53 are distributed in a staggered manner and have a certain spacing and simultaneously the through hole 56 is provided in the supporting member 55, the circulation of air is guaranteed.

Figure 9:
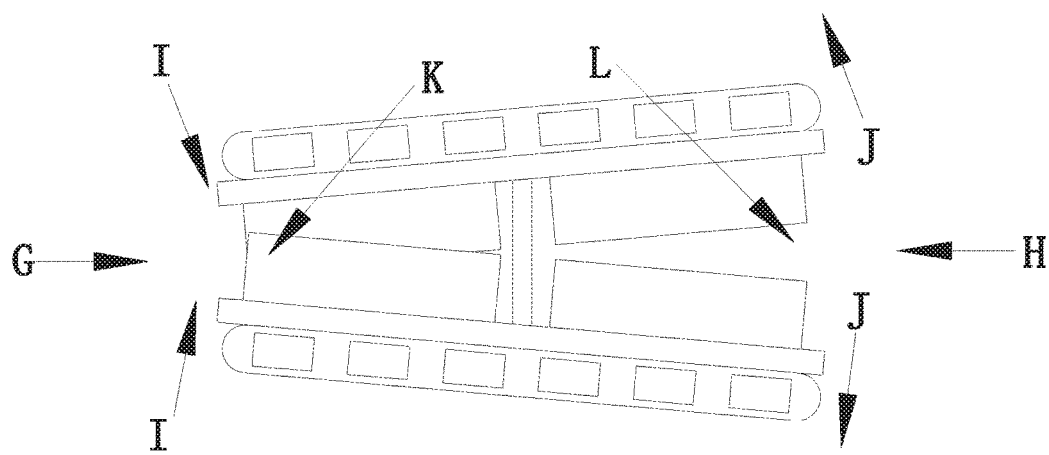
FIG. 9 is a partial enlarged top view of a bending region deformed during bending according to Embodiment 2 of the present invention.

As illustrated in FIG. 9, side G is an inner side of the bending region, side H is an outer side of the bending region, direction I is a squeezing direction of the bending region 5 during bending in Embodiment 2 and direction J is a stretching direction of the bending region 5 during bending in Embodiment 2. When the micro-channel heat exchanger is bent, the bending region 5 is stressed and bent from a flat plate state to a curved surface having a certain radian, at this moment an arc length of the outer side of the bending region 5 is greater than an arc length of the inner side of the bending region 5. On side K, due to the effect of squeezing, the first ribs 52 and the second ribs 53 are mutually inserted into gaps; and on side L, due to the effect of stretching, the first ribs 52 and the second ribs 53 get far away from each other, and thereby the problems such as inverted fins and deformation and the like that occur when common fins are bent are solved.

What are described above are just embodiments of the present invention. However, the protection scope of the present invention shall not be limited thereto. One skilled in the art should understand that the present invention includes but is not limited to the contents described in the drawings and the embodiments above. Any modifications made without going beyond the functions and structural principles of the present invention shall be included in the scope of the claims.

The invention claimed is:

1. A micro-channel heat exchanger, comprising at least two header pipes, a plurality of first flat pipes and fins, the first flat pipes being connected between adjacent header pipes, the fins being installed between adjacent first flat pipes, wherein the micro-channel heat exchanger further comprises a bending region formed by bending the header pipes, second flat pipes and a bending assembly are provided in the bending region, the second flat pipes are connected between adjacent header pipes, the bending assembly is distributed between adjacent second flat pipes, and air is capable of passing through the bending assembly to circulate;
wherein the bending assembly comprises a plurality of strip-shaped bending members and the bending members have creases along a length direction; and
through holes are provided in the bending members.

2. The micro-channel heat exchanger according to claim 1, wherein the through holes are located in left and right sides of the creases.

3. The micro-channel heat exchanger according to claim 1, wherein the bending assembly further comprises first base plates which are provided on side surfaces of the second flat pipes and the bending members are provided on the first base plates.

4. The micro-channel heat exchanger according to claim 3, wherein the bending members and the first base plates are fixed through brazing; or the first base plates and the second flat pipes are connected through brazing.

5. A micro-channel heat exchanger, comprising at least two header pipes, a plurality of first flat pipes and fins, the first flat pipes being connected between adjacent header pipes, the fins being installed between adjacent first flat pipes, wherein the micro-channel heat exchanger further comprises a bending region formed by bending the header pipes, second flat pipes and a bending assembly are provided in the bending region, the second flat pipes are connected between adjacent header pipes, the bending assembly is distributed between adjacent second flat pipes, and air is capable of passing through the bending assembly to circulate,
wherein the bending assembly comprises first ribs and second ribs, the first ribs are located on one side of the second flat pipes, the second ribs are located on an adjacent side opposite to the side on which the first ribs are provided, and the first ribs and the second ribs are distributed in a staggered manner.

6. The micro-channel heat exchanger according to claim 5, wherein the bending assembly further comprises base plates, the base plates are distributed between adjacent second flat pipes, one side of each base plate is connected with the second flat pipe and the other side is connected with the first ribs or the second ribs; or the base plates and the second flat pipes are connected through brazing.

7. The micro-channel heat exchanger according to claim 6, wherein the bending assembly further comprises a supporting rack through which adjacent base plates are connected.

8. The micro-channel heat exchanger according to claim 7, wherein a through hole is provided in the supporting rack.

* * * * *